United States Patent [19]
Araki et al.

[11] Patent Number: 6,125,086
[45] Date of Patent: Sep. 26, 2000

[54] METHOD AND APPARATUS FOR HIGH SPEED REPRODUCTION OF INFORMATION RECORDED ON AN OPTICAL RECORDING MEDIUM

[75] Inventors: Yoshitsugu Araki; Junichi Furukawa, both of Tsurugashima, Japan

[73] Assignee: Pioneer Corporation, Tokyo, Japan

[21] Appl. No.: 09/235,295

[22] Filed: Jan. 22, 1999

[30] Foreign Application Priority Data

Feb. 13, 1998 [JP] Japan .................................. 10-031611

[51] Int. Cl.[7] .................................................. G11B 17/22
[52] U.S. Cl. ............................................................. 369/32
[58] Field of Search ........................... 369/32, 33, 44.28, 369/44.37, 44.38, 44.27, 44.29, 44.34

[56] References Cited

U.S. PATENT DOCUMENTS

| | | | |
|---|---|---|---|
| 4,580,255 | 4/1986 | Inoue et al. ........................ | 369/44.29 |
| 4,727,528 | 2/1988 | Wyland ................................... | 369/33 |
| 5,023,855 | 6/1991 | Kobayashi et al. .................. | 369/44.28 |
| 5,202,865 | 4/1993 | Yanagi .................................... | 369/32 |
| 5,208,792 | 5/1993 | Imanaka ............................... | 369/44.38 |
| 5,483,515 | 1/1996 | Cheng et al. ......................... | 369/124 |
| 5,638,350 | 6/1997 | Fuji ....................................... | 369/44.37 |

*Primary Examiner*—Tan Dinh
*Attorney, Agent, or Firm*—Sughrue, Mion, Zinn, Macpeak & Seas, PLLC

[57] ABSTRACT

A recorded information reading method and a recorded information reproducing apparatus capable of reproducing information from a recording medium at a high speed. A reading operation by a pickup for one rotation of a disk and a (N−1)-track jump operation are repetitively executed in alternation when a relatively small amount of read errors is included in information data read by the pickup for simultaneously reading recorded information from each of N recording tracks (N is an integer larger than two).

16 Claims, 11 Drawing Sheets

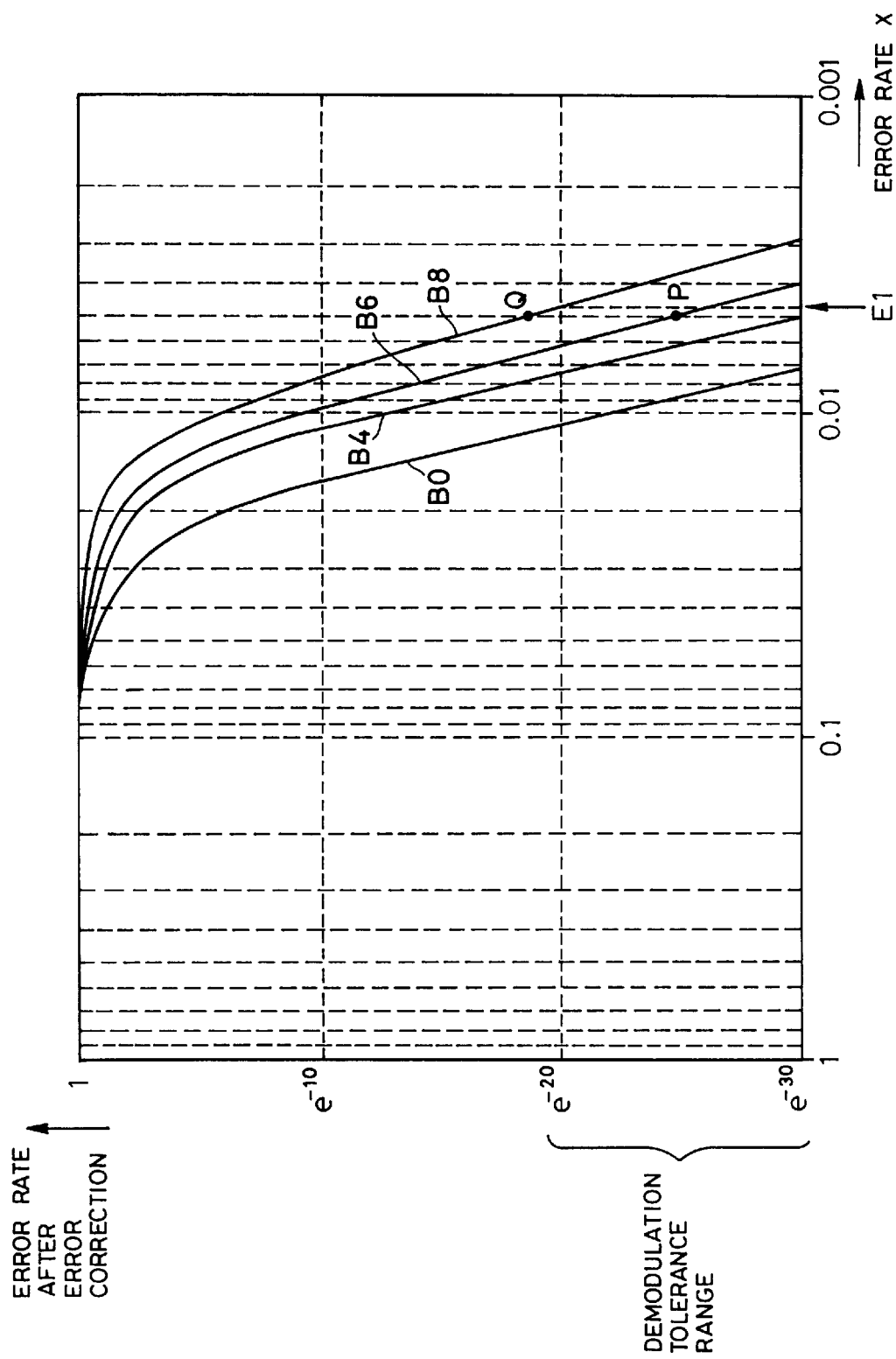

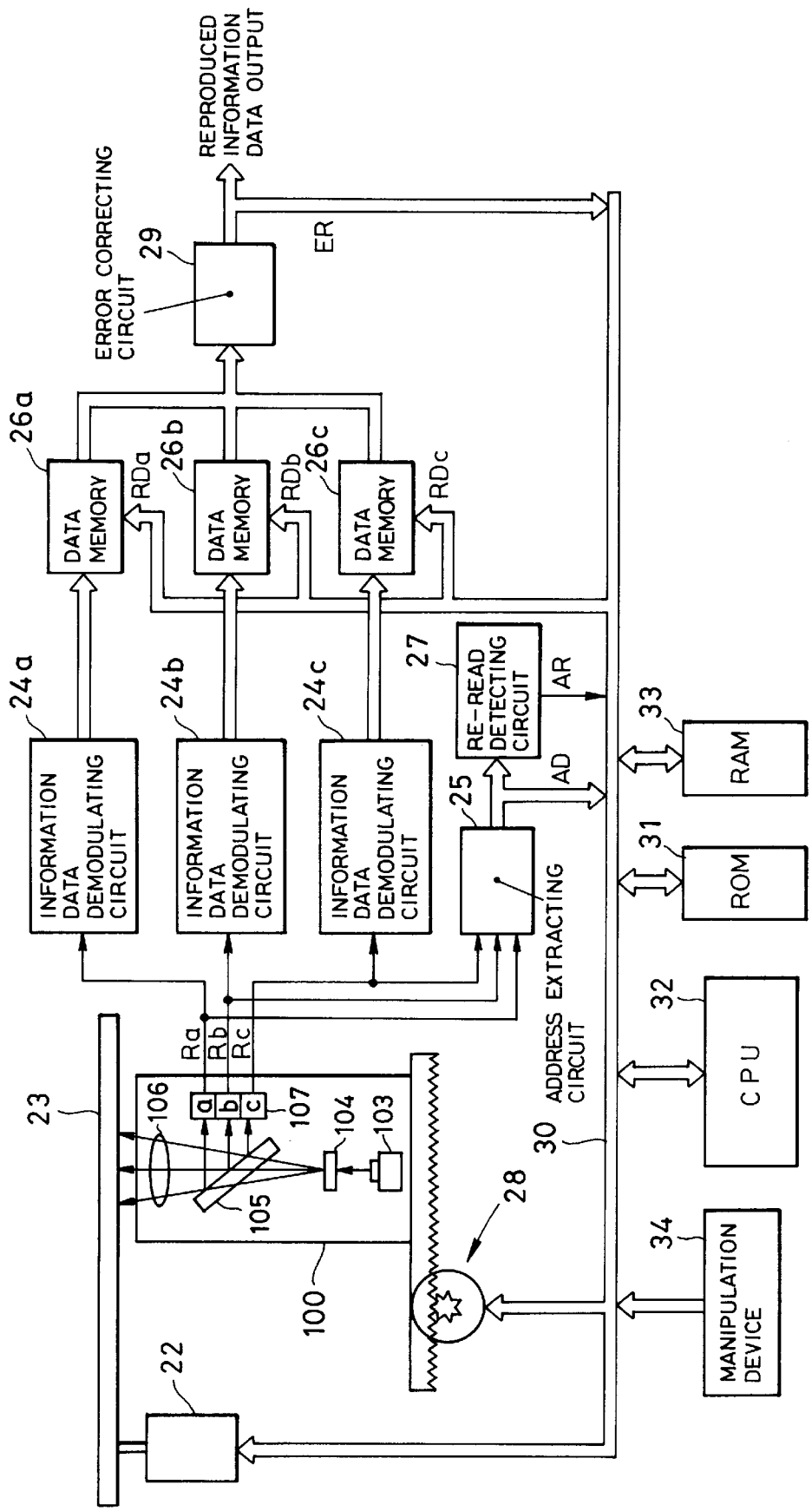

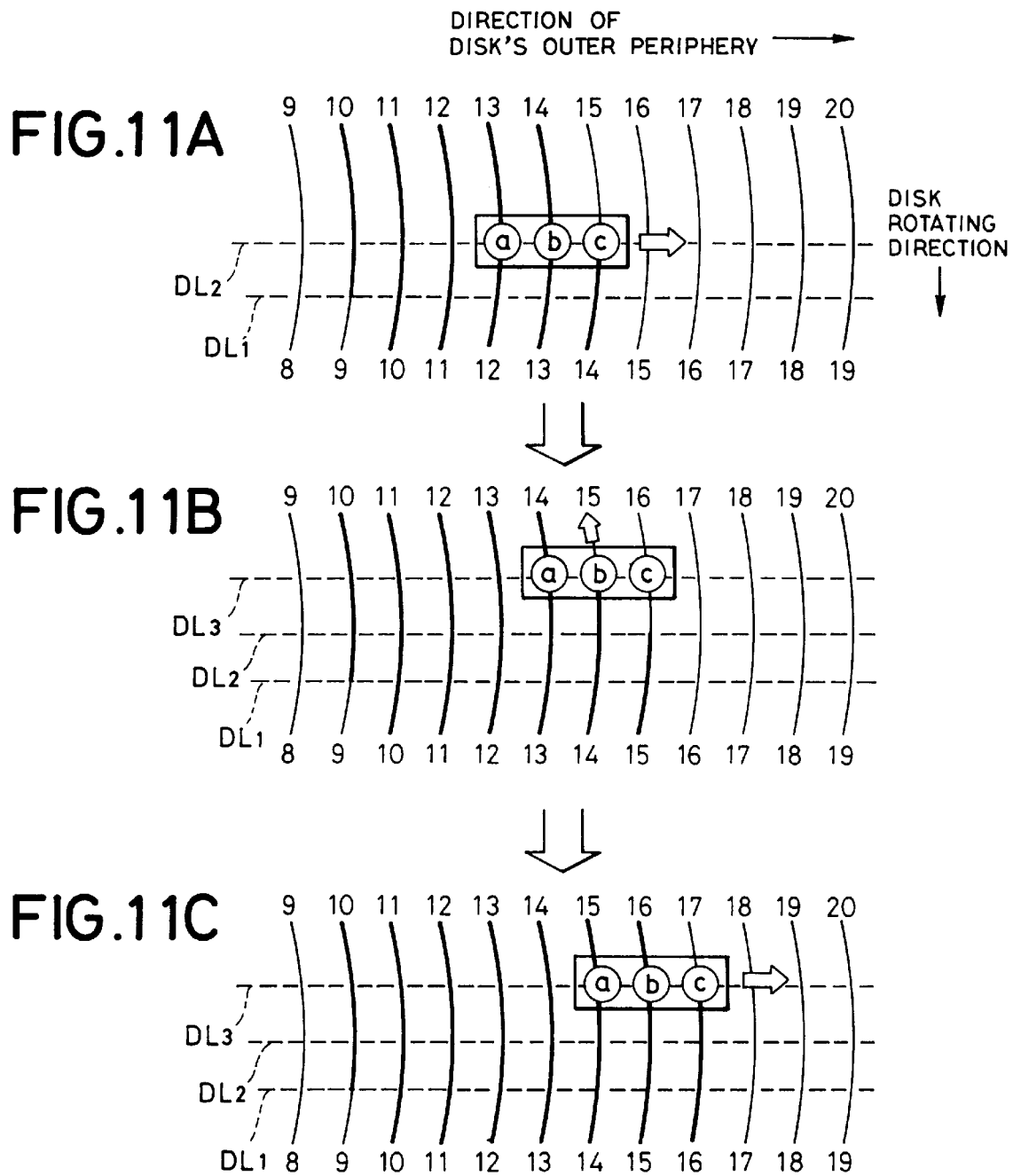

METHOD AND APPARATUS FOR HIGH SPEED REPRODUCTION OF INFORMATION RECORDED ON AN OPTICAL RECORDING MEDIUM

BACKGROUND OF THE INVENTION

1. Field of the Invention

The present invention relates to a recorded information reproducing apparatus for reproducing recorded information from a recording medium.

2. Description of Related Art

In recent years, a need exists for a recorded information reproducing method and a recorded information reproducing apparatus which can more accurately reproduce information data at a higher speed from a recording disk on which the information data is recorded.

OBJECT AND SUMMARY OF THE INVENTION

It is an object of the present invention to provide a recorded information reading method in a recorded information reproducing apparatus which is capable of highly accurately reproducing recorded information from a recording disk at a high speed.

A recorded information reading method according to a first aspect of the present invention is adapted for use in a recorded information reproducing apparatus for reproducing recorded information on a recording disk to derive reproduced information data, wherein the recorded information reproducing apparatus comprises information reading means for simultaneously reading recorded information from each of N recording tracks formed on the recording disk to derive N read signals, where N is an integer equal to or larger than two, and error correcting means for detecting errors possibly occurring in the read signals, correcting the errors, and outputting error corrected read signals as the reproduced information data, and the method comprises the step of repetitively executing a reading operation by the information reading means for one rotation of the recording disk and a (N−1)-track jump operation in alternation, when the errors are small in number.

A recorded information reading method according to a second aspect of the present invention further comprises the step of repetitively executing a reading operation by the information reading means for one rotation of the recording disk and a track jump operation across (N−2) tracks or less in alternation, when the errors are large in number.

A recorded information reading method according to a third aspect of the present invention is adapted for use in a recorded information reproducing apparatus for reproducing recorded information on a recording disk to derive reproduced information data, wherein the recorded information reproducing apparatus comprises information reading means for simultaneously reading recorded information from each of N recording tracks formed on the recording disk to derive N read signals, where N is an integer equal to or larger than two, and error correcting means for detecting errors possibly occurring in the read signals, correcting the errors, and outputting error corrected read signals as the reproduced information data, and the method comprises the steps of calculating a data error rate in the read signals, and repetitively executing an information reading operation by the information reading means for one rotation of the recording disk to a disk radial line, and a (N−1)-track jump operation in alternation, when the data error rate is smaller than a predetermined error rate.

A recorded information reading method according to a fourth aspect of the present invention is adapted for use in a recorded information reproducing apparatus for reproducing recorded information on a recording disk to derive reproduced information data, wherein the recorded information reproducing apparatus comprises information reading means for simultaneously reading recorded information from each of N recording tracks formed on the recording disk to derive N read signals, where N is an integer equal to or larger than two, and error correcting means for detecting errors possibly occurring in the read signals, correcting the errors, and outputting error corrected read signals as the reproduced information data, and the method comprises the steps of calculating a data error rate in the read signals, repetitively executing an information reading operation until read signals, which have already been read in the preceding rotation of the disk, are read again, and a (N−1)-track jump operation in alternation, when the data error rate is smaller than a predetermined error rate, and repetitively executing an information reading operation until read signals, which have already been read in the preceding rotation of the disk, are read again, and a track jump operation across (N−2) tracks or less in alternation, when the data error rate is larger than the predetermined error rate.

In a recorded information reading method according a fifth aspect of the present invention, the error detection is a random error detection, and the error correcting means corrects burst errors of a line length corresponding to the data error rate in the read signals.

A recorded information reproducing apparatus according to a sixth aspect of the present invention is adapted to reproduce recorded information on a recording disk to derive reproduced information data, and comprises information reading means for simultaneously reading recorded information from each of N recording tracks formed on the recording disk to derive N read signals, where N is an integer larger than two, error correcting means for detecting errors possibly occurring in the read signals, correcting the errors, and outputting error corrected read signals as the reproduced information data, and control means for repetitively executing a reading operation by the information reading means for one rotation of the recording disk and a (N−1)-track jump operation in alternation when the errors are small in number.

In a recorded information reproducing apparatus according to a seventh aspect of the present invention, the control means repetitively executes a reading operation by the information reading means for one rotation of the recording disk and a track jump operation across (N−2) tracks or less in alternation, when the errors are large in number.

A recorded information reproducing apparatus according to an eighth aspect of the present invention is adapted to reproduce recorded information on a recording disk to derive reproduced information data, and comprises information reading means for simultaneously reading recorded information from each of N recording tracks formed on the recording disk to derive N read signals, where N is an integer larger than two, error correcting means for detecting errors possibly occurring in the read signals, correcting the errors, and outputting error corrected read signals as the reproduced information data, error rate measuring means for measuring a data error rate in the read signals, and control means for repetitively executing an information reading operation by the information reading means for one rotation of the recording disk to a disk radial line and a (N−1)-track jump operation in alternation, when the data error rate is smaller than a predetermined error rate.

A recorded information reproducing apparatus according to a ninth aspect of the present invention is adapted to reproduce recorded information on a recording disk to derive reproduced information data, and comprises information reading means for simultaneously reading recorded information from each of N recording tracks formed on the recording disk to derive N read signals, where N is an integer larger than two, error correcting means for detecting errors occurring in the read signals, correcting the errors, and outputting error corrected read signals as the reproduced information data, error rate measuring means for measuring a data error rate in the read signals, and control means for repetitively executing an information reading operation until read signals, which have already been read in the preceding rotation of the disk, are read again, and a (N−1)-track jump operation in alternation, when the data error rate is smaller than a predetermined error rate, and repetitively executing an information reading operation until read signals, which have already been read in the preceding rotation of the disk, are read again, and a track jump operation across (N−2) tracks or less in alternation, when the data error rate is larger than the predetermined error rate.

In a recorded information reproducing apparatus according to a tenth aspect of the present invention, the error detection is a random error detection, and the error correcting means corrects burst errors of a line length corresponding to the data error rate in the read signals.

BRIEF DESCRIPTION OF THE DRAWINGS

FIG. 5 is a graph illustrating a correspondence relationship of the error rate X to an error rate for corrected information data after it has been corrected for errors by an error correcting circuit 29 when a total length of burst errors is equal to 0, 4, 6 or 8 lines of an ECC block;

FIG. 6 is a block diagram illustrating the configuration of a recorded information reproducing apparatus according to a second embodiment of the present invention;

FIGS. 11A to 11C are diagrams representing a reading operation when the error rate X is larger than the error rate E1.

DETAILED DESCRIPTION OF THE PREFERRED EMBODIMENTS

The present invention will hereinafter be described for a variety of embodiments thereof with reference to the accompanying drawings.

Figure 1:
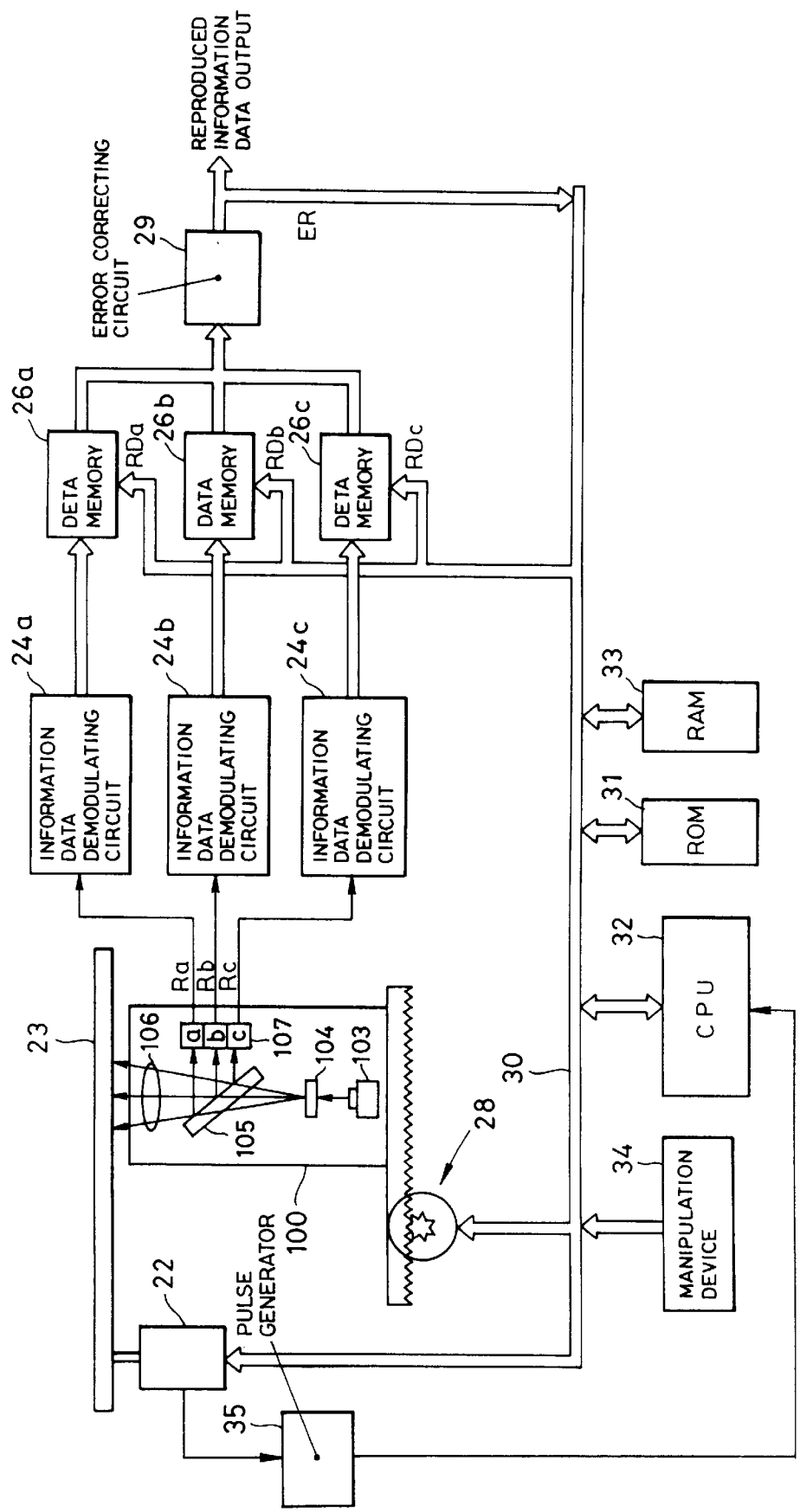
FIG. 1 is a block diagram illustrating the configuration of a recorded information reproducing apparatus according to a first embodiment of the present invention.

FIG. 1 is a block diagram illustrating the configuration of a recorded information reproducing apparatus for reproducing recorded information from a recording disk based on a recorded information reading method according to a first embodiment of the present invention.

In FIG. 1, a laser beam emitted from a laser oscillator 103 mounted in a pickup 100 is divided into three information reading beams through a grating 104. The three information reading beams are irradiated onto a recording surface of a recording disk 23 such as, for example, DVD (digital versatile disk), CD, LD or the like, through a half mirror 105 and an objective lens 106. Each of the three information reading beams is irradiated to a corresponding one of three mutually adjacent recording tracks on the recording surface of the recording disk 23. It should be noted herein that while the recording disk 23 is typically formed with a single spiral recording track, this single recording track is regarded as a collection of tracks each extending over one round of the disk 23 for purposes of describing the first embodiment.

Each of the three information reading beams irradiated to and reflected off corresponding one of three recording tracks is guided to a light detector 107 through the objective lens 106 and the half mirror 105. The light detector 107 includes three light detecting elements 107a–107c independent of each other. The light detecting element 107b receives the reflected light from the central recording track within the three recording tracks through the half mirror 105, and opto-electrically transduces the reflected light into a read signal Rb which is supplied to an information data demodulating circuit 24b. The light detecting element 107a receives reflected light from a recording track adjacent to the central recording track on one side through the half mirror 105, and opto-electrically transduces the reflected light into a read signal Ra which is supplied to an information data demodulating circuit 24a. The light detecting element 107c receives reflected light from the recording track adjacent to the central recording track on the other side through the half mirror 105, and opto-electrically transduces the reflected light into a read signal Rc which is supplied to an information data demodulating circuit 24c.

With the configuration as described above, the pickup 100, serving as an information reading means, simultaneously reads recorded information from each of three mutually adjacent tracks on the recording disk 23, and produces the three corresponding read signals Ra–Rc corresponding to the respective recording tracks.

The information data demodulating circuit 24a converts the read signal Ra into a binary digital signal, demodulates this digital signal to recover original information data which is then supplied to a data memory 26a. The data memory 26a sequentially receives the demodulated information data which is written thereinto for storage. Also, the data memory 26a sequentially reads information data stored in a manner as mentioned above in response to a read instruction signal RDa supplied thereto from a CPU 32, and supplies the read information data to an error correcting circuit 29. The information data demodulating circuit 24b converts the read signal Rb into a binary digital signal, demodulates this digital signal to recover original information data which is then supplied to a data memory 26b. The data memory 26b sequentially receives the demodulated information data which is written thereinto for storage. Also, the data memory 26b sequentially reads information data stored in a manner as mentioned above in response to a read instruction signal RDb supplied thereto from the CPU 32, and supplies the read information data to an error correcting circuit 29. The information data demodulating circuit 24c converts the read signal Rc into a binary digital signal, demodulates this digital signal to recover original information data which is then supplied to a data memory 26c. The data memory 26c sequentially receives the demodulated information data which is written thereinto for storage. Also, the data memory 26c sequentially reads information data stored in a manner as mentioned above in response to a read instruction signal RDc supplied thereto from the CPU 32, and supplies the read information data to an error correcting circuit 29.

The error correcting circuit 29 detects errors in units of one code block, for example, ECC blocks each including 16 sectors (32 Kbytes) for the information data read from the data memories 26a–26c. In this event, the error correcting circuit 29, when detecting an error in each bit in such information data, generates an error detecting signal ER for each bit in which the error has been detected, and sends the error detecting signal ER onto a CPU bus 30. The error correcting circuit 29 also performs error correction processing on the information data in accordance with the result of the error detection, and outputs the processed information data as reproduced information data.

A spindle motor 22 drives the recording disk 23 to rotate in a rotating direction corresponding to a forward rotation instruction signal or a reverse rotation instruction signal supplied thereto through the CPU bus 30. A slider mechanism 28 moves the pickup 100 in a radial direction of the disk in response to a read start position signal or a track jump instruction signal supplied thereto through the CPU bus 30.

A pulse generator 35 generates a pulse signal including a number of pulses (assume hereinafter that the pulse signal includes 36 pulses per rotation of the disk 23) synchronized with the rotation of the spindle motor 22 (i.e., the rotation of the disk 23), and supplies the pulse signal to the CPU 32.

The CPU bus 30 interconnects a ROM (Read Only Memory) 31 which has previously stored therein software based on the recorded information reproducing method according to the present invention; the CPU (Central Processing Unit) 32 for sending a variety of instruction signals as mentioned above onto the CPU bus 30 in accordance with such software for controlling the reproduction; a RAM (Random Access Memory) 33; and a manipulation device 34 for receiving a variety of manipulation instructions from a user.

Next, description will be made on an information reproducing operation implemented by the foregoing configuration.

Figure 2:
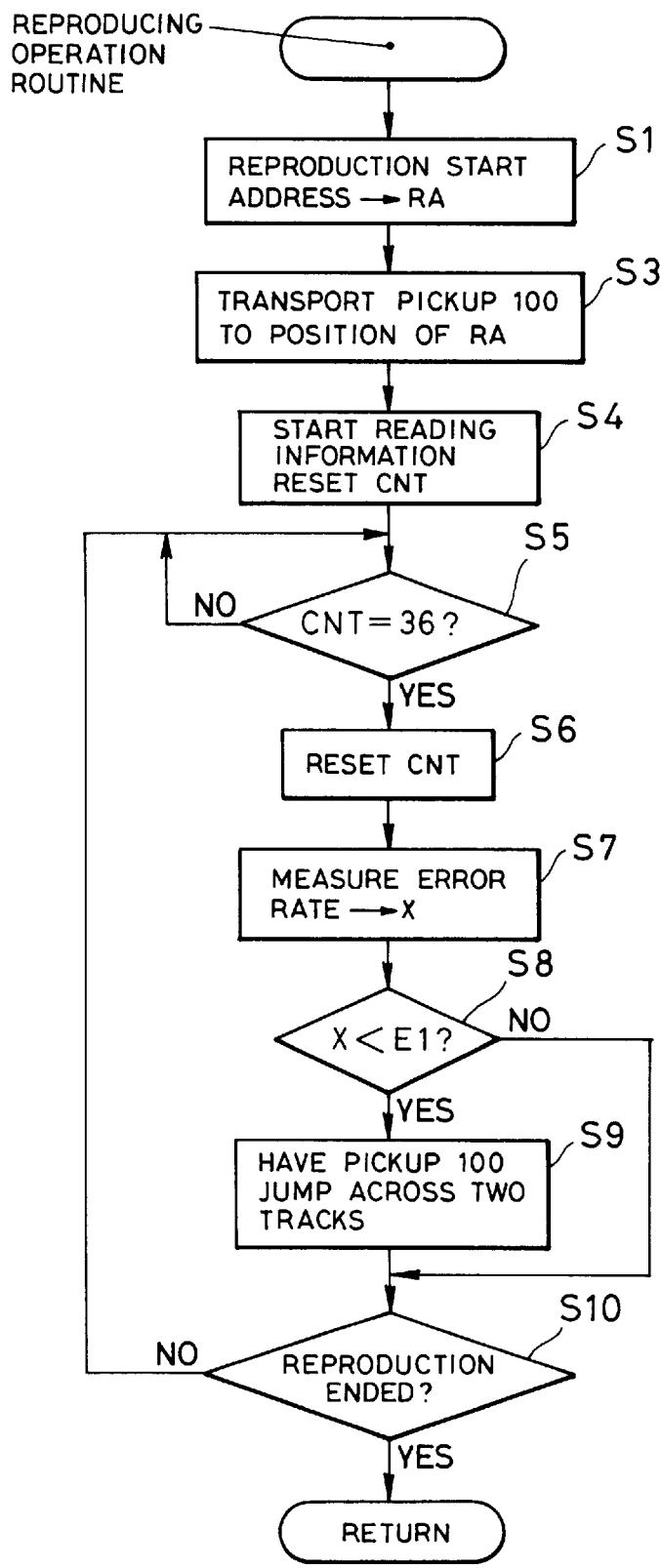
FIG. 2 is a flow chart illustrating a subroutine for a reproducing operation according to the first embodiment of the present invention.

FIG. 2 is a flow chart illustrating a subroutine for a reproducing operation performed by the CPU 32 based on the software stored in the ROM 31.

The CPU 32 proceeds to execute the subroutine for a reproducing operation as illustrated in FIG. 2 when it receives a reproduction start instruction and an associated reproduction start address from the manipulation device 34 during execution of a main flow (not described).

First, the CPU 32 stores the reproduction start address in a built-in register as RA (step S1).

Next, the CPU 32 supplies the spindle motor 22 and the slider mechanism 28 through the CPU bus 30 with a read start position signal for transporting the pickup 100 to a position on a disk indicated by the reproduction start address RA (step S3). The slider mechanism 28 transports the pickup 100 to the position on the disk indicated by the read start position signal.

Next, the CPU 32 supplies the spindle motor 22 through the CPU bus 30 with a forward rotation instruction signal for starting an information reading operation from the read start position. Also, the CPU 32 switches the respective read instruction signals RDa–RDc and supplies them to the data memories 26a–26c associated therewith each time the pickup 100 has read for one rotation of the disk. The CPU 32 further resets the value on a counter CNT for counting the number of pulses supplied from the pulse generator 35 to zero (step S4). The execution of step S4 causes the pickup 100 to start an information reading operation from the read start position, and to simultaneously derive read signals Ra–Rc from three respective recording tracks, which are then supplied to the information data demodulating circuits 24a–24c, respectively. Each of information data demodulated by each of the information data demodulating circuits 24a–24c is written into the data memory 26a–26c associated therewith. Here, the data memories 26a–26c are alternately brought into a read state each time the pickup 100 has read for one rotation of the disk. In this way, information data from each recording track, which has been written separately into the data memories 26a–26c, is linked together in the same form as the information data has been recorded, and supplied to the error correcting circuit 29. The error correcting circuit 29 performs an error correction on the information data supplied thereto, generates an error detecting signal ER each time an error bit is detected in any of the data memories 26a–26c, and sends the error detecting signal ER onto the CPU bus 30. The error correcting circuit 29 further outputs the error corrected bits as reproduced information data.

The CPU 32 also starts counting the number of pulses supplied from the pulse generator 35 from the state where the pickup 100 is at the read start position, in parallel with the start of the reading operation.

Next, the CPU 32 executes a determination as to whether or not 36 pulses have been counted, corresponding to one rotation of the disk, counting from the state where the pickup 100 is positioned at the reproduction start address RA, i.e., whether or not the counter CNT has reached 36, until the value on the counter CNT reaches 36 (step S5). Next, the CPU 32 resets the counter CNT to zero (step S6).

Next, the CPU 32 counts the number of the error detecting signals ERs over a predetermined period, calculates an error rate based on the number of error detecting signals ER per code block in the information data which has been read within the predetermined period, and stores this error rate in a built-in register as an error rate X (step S7).

The CPU 32 next determines whether or not the error rate X is smaller than a predetermined error rate E1 (step S8). If determining at step S8 that the error rate X is smaller than the predetermined error rate E1, the CPU 32 supplies the slider mechanism 28 through the CPU bus 30 with a track jump instruction for causing the pickup 100 to jump across two tracks (step S9). With the execution of step S9, the slider mechanism 28 causes the pickup 100 to jump across two tracks towards the outer periphery of the disk. By performing the operations along the foregoing steps S5–S9, the pickup 100 can jump across two tracks on the same radial line as the reading operation start position RA each time the disk is rotated once when the error rate X is smaller than the predetermined error rate E1.

It should be noted that even during the execution of step S5, the pickup 100 is reading recorded information from each of three recording tracks on the recording disk 23.

On the other hand, if determining at step S8 that the error rate X is larger than the predetermined error rate E1, the CPU 32 proceeds to step S10 without executing the track jump.

After the track jump has been done at step S9, the pickup 100 again starts reading information from tracks at the position to which it has jumped.

After the execution of step S8 or S9, the CPU 32 determines whether or not a reproduction end instruction has been issued from the manipulation device 34 (step S10). If determining at step S10 that the reproduction end instruction is not issued, the CPU 32 returns to step S5 to repetitively execute the operation as described above. On the other hand, if determining that the reproduction end instruction has been issued, the CPU 32 exits the subroutine for the reproducing operation, and returns to execute the main routine.

In the following, description will be made on the operation performed by the execution of the subroutine for the reproducing operation as illustrated in FIG. 2.

First, the execution of steps S1–S4 in FIG. 2 causes the pickup 100 to move to a position on a disk indicated by the reproduction start address RA and start an information reading operation from this position. More specifically, the three light detectors 107a–107c mounted in the pickup 100 simultaneously read information individually from three mutually adjacent recording tracks.

Next, the execution of steps S5, S6 causes the pickup 100 to perform a reading operation until the disk is rotated once so that the pickup 100 faces the same radial line as the reading operation start position RA. Next, step S7 is executed to measure an error rate X during this information reading operation.

If the error rate X is:

X<Error Rate E1, the operation at step S9 is performed. The execution of step S9 causes the pickup 100 to jump across two tracks towards the outer periphery of the disk.

If the error rate X is:

Error Rate E1<X, the track jump operation is not performed.

After the completion of this track jump, the CPU 32 again returns to step S5 to repetitively execute the information reading operation and the track jump operation as described above in alternation.

FIGS. 3A to 3C and FIGS. 4A to 4C are diagrams for representing the operation of the pickup 100 performed by the execution of the reproduction operation flow illustrated in FIG. 2.

Figure 3A:
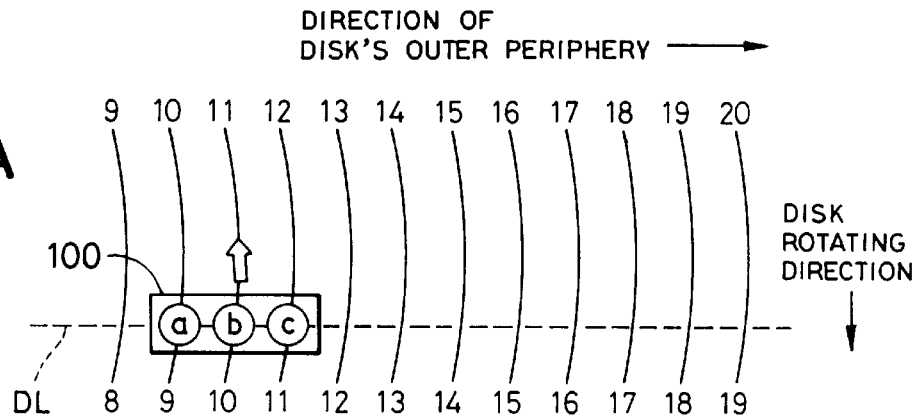
FIGS. 3A to 3C are diagrams representing a reading operation when an error rate X is smaller than an error rate E1.

First, as illustrated in FIG. 3A, the three light detectors 107a–107c mounted in the pickup 100 individually and simultaneously start reading information data recorded on recording tracks 10, 11, 12, respectively, from positions on a disk radial line DL.

Figure 3B:
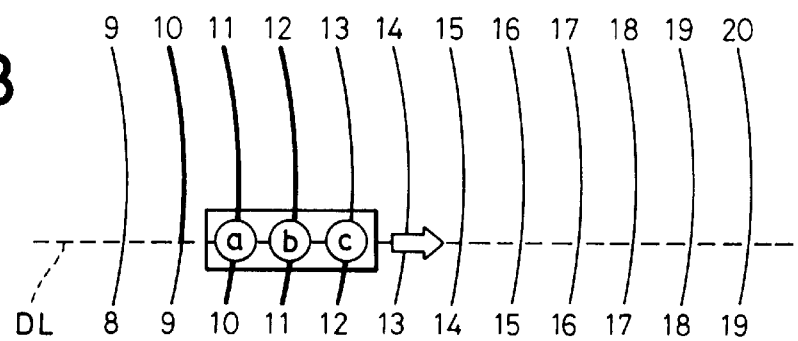
Figure 3C:
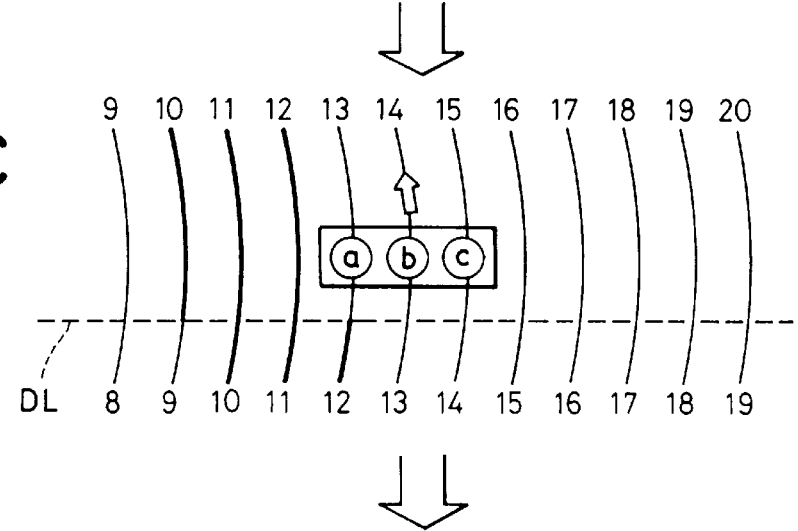

Then, as illustrated in FIG. 3B, when the light detectors 107a–107c have completely read the information data recorded on the respective recording tracks 10, 11, 12 through one rotation of the disk, the pickup 100 again reaches the position on the disk radial line DL. When the pickup 100 reaches the position on the disk radial line DL, it jumps across two tracks towards the outer periphery of the disk. Since the recording disk 23 is still being rotated while the pickup 100 is jumping across two tracks, the pickup 100 jumps to reach at a position beyond the disk radial line DL, as illustrated in FIG. 3C. The pickup 100 starts reading information data recorded on respective recording tracks 13, 14, 15 from that position.

Figure 4A:
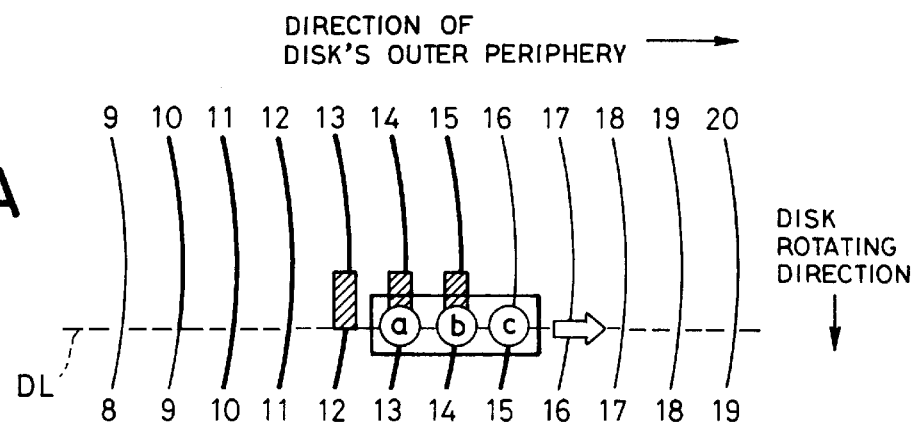
FIGS. 4A to 4C are diagrams representing a reading operation when the error rate X is smaller than the error rate E1.
Figure 4B:
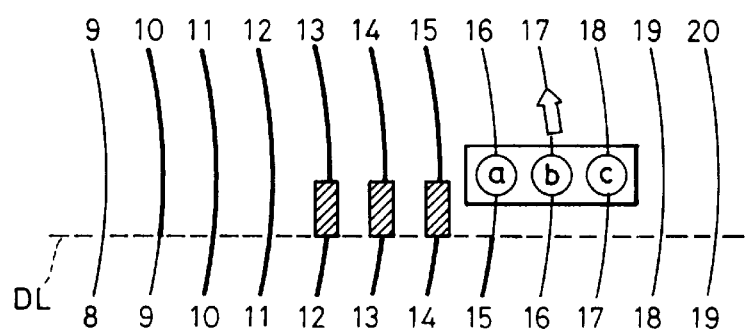

Then, as the pickup 100 again reaches the position on the disk radial line DL after it has completed the reading operation for one rotation of the disk, the pickup 100 jumps across two tracks towards the outer periphery of the disk, as illustrated in FIG. 4A. Thus, beginning portions of the respective recording tracks 13, 14, 15, i.e., the portions indicated by hatching in FIG. 4A are information dropping sections from which no information is read. Since the recording disk 23 is still being rotated while the pickup 100 is jumping across two tracks, the pickup 100 jumps to a position beyond the disk radial line DL, as illustrated in FIG. 4B. The pickup 100 starts reading information data recorded on respective recording tracks 16, 17, 18 from that position.

Figure 4C:
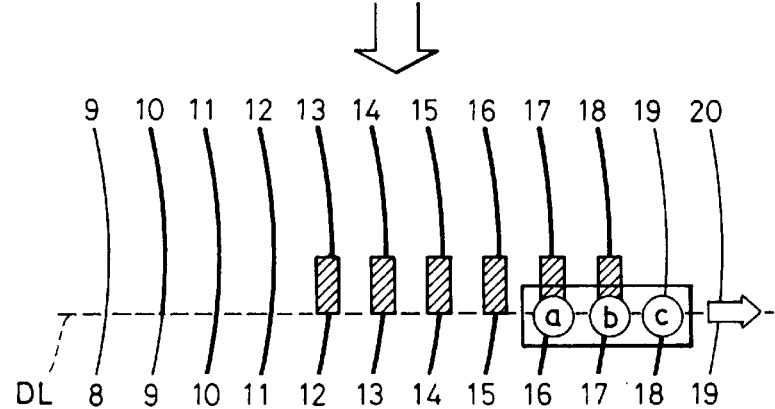

Then, as the pickup 100 again reaches the position on the disk radial line DL after it has completed the reading operation for one rotation of the disk, the pickup 100 jumps across two tracks towards the outer periphery of the disk, as illustrated in FIG. 4C. Thus, beginning portions of the respective recording tracks 16, 17, 18, i.e., portions indicated by hatching in FIG. 4C are information dropping sections from which no information is read.

The information dropping sections indicated by hatching in each of FIGS. 4A–4C are treated as burst errors in the error correcting circuit 29, and recovered by error correction processing performed by the error correcting circuit 29.

FIG. 5 is a graph illustrating a correspondence relationship of the error rate X to an error rate for corrected information data after it has been corrected for errors by an error correcting circuit 29 when a total of burst error lengths per block is equal to 0, 4, 6 or 8 lines of an ECC block.

Four curves B0, B4, B6, B8 shown in FIG. 5 each represent that the length of burst errors occurring in information data output from the information data demodulating circuit 24 is 0, 4, 6 or 8 lines of an ECC block.

For example, when the error rate X before error correction is "0.005," an intersection P of this error rate with the curve B6, which indicates that the length of burst errors is equal to six lines, falls within a demodulation tolerance range (the error rate after error correction is $e^{-20}$ or less). On the other hand, an intersection Q of the error rate at "0.005" with the curve B8, which indicates that the length of burst errors is equal to eight lines, is out of the demodulation tolerance range. In other words, this graph represents that with the error rate X being at "0.005," even if six lines of data have been dropped, the dropped six lines of data can be substantially recovered by the error correction processing by the error correcting circuit 29, whereas the length of burst errors amounting to eight lines could not be recovered by the error correction processing.

As shown in FIG. 5, the aforementioned error rate E1 refers to an error rate which indicates that if the error rate X during information read is smaller than this error rate E1, burst errors can be substantially corrected by the error correcting circuit 29 even if the total length of the burst errors corresponds to eight lines of an ECC block.

Stated another way, if the length of each of the three information dropping sections, indicated by hatching in FIGS. 4A–4C, is smaller than the length corresponding to eight lines of an ECC block, the recording information can be recovered in the error correcting circuit 29 even if these sections are not read.

As described above, when the read error rate X is smaller than the predetermined first error rate E1 as mentioned, an information reading operation for one rotation of a disk up to the disk radial line DL and a two-track jump operation are alternately performed to simultaneously read recorded information from three recording tracks.

If the read error rate X is larger than the predetermined error rate E1, the track jump performed while information data is being read from the disk would cause information dropping sections to be error incorrectable, and result in drops in reproduced data, so that the track jump should not be performed.

Thus, in an apparatus capable of simultaneously reading recorded information from a plurality of recording tracks with a plurality of information reading beams, as is the case of this embodiment, the foregoing read method fails to take full advantage of the apparatus having the plurality of information reading beams.

A second embodiment shown below has been made in view of the problem as mentioned, and is adapted to change the number of tracks to jump in accordance with a read error rate.

(Second Embodiment)

The second embodiment is adapted to perform a track jump when information on recording tracks, from which the information has been read during the preceding rotation of a disk, is read again, rather than performing a track jump on the same radial line as the read start position RA each time the disk is rotated once, as is the case of the first embodiment.

FIG. 6 is a block diagram illustrating the configuration of a recorded information reproducing apparatus for reproducing recorded information from a recording disk based on a recorded information reading method according to the second embodiment.

Components in FIG. 6 similar to those in FIG. 1 are designated the same reference numerals, and detailed description thereon is omitted.

The configuration in FIG. 6 differs from that in FIG. 1 in that the pulse generator 35 is omitted, and an address extracting means 25 and a re-read detecting circuit 27 are additionally provided.

Specifically, read signals produced by a light detector 107 are supplied to an information data demodulating circuit 24 in a manner similar to FIG. 1, as well as to the address extracting circuit 25.

The address extracting circuit 25 sequentially detects physical addresses on the disk from the read signals Ra, Rb, Rc, and supplies these physical addresses to the re-read detecting circuit 27 and a CPU bus 30 as current addresses ADa–ADc.

The re-read detecting circuit 27 generates a re-read detecting signal AR and sends it onto the CPU bus 30 when each of the current addresses ADa–ADc has been already read in the preceding rotation of the disk.

In the following, description will be made on an information reproducing operation performed by the configuration described above.

Figure 7:
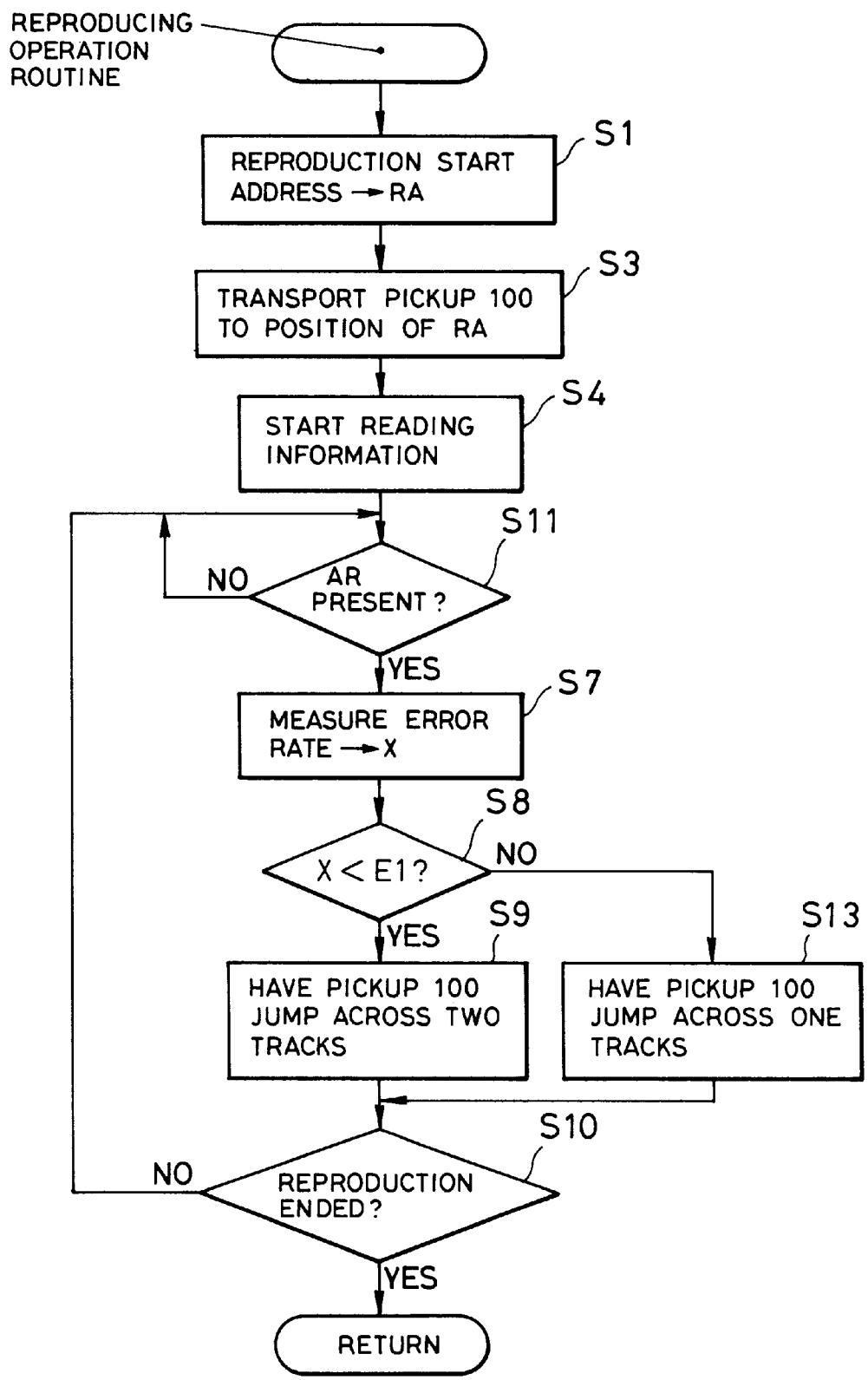
FIG. 7 is a flow chart illustrating a subroutine for a reproducing operation according to the second embodiment of the present invention.

FIG. 7 is a flow chart illustrating a subroutine for a reproducing operation performed by the CPU 32 based on software stored in a ROM 31 in FIG. 6.

Steps at which similar operations to FIG. 2 are performed are designated the same step numbers, and detailed description thereon is omitted.

First, when the CPU 32 receives a reproduction start instruction and an associated reproduction start address RA from a manipulation device 34 during the execution of a main routine, a pickup 100 is transported to the reproduction start address RA to start an information reading operation (S1–S4).

Next, the CPU 32 determines whether or not the re-read detecting signal AR has been sent onto the CPU bus 30 from the re-read detecting circuit 27 until the re-read detecting signal AR is sent onto the CPU bus 30 (step S11). It should be noted that the pickup 100 is reading recorded information from each of three recording tracks on a recording disk 23 even during the execution of step S11.

If determining at step S11 that the re-read detecting signal AR has been sent onto the CPU bus 30, the CPU 32 calculates an error rate in information data read in a predetermined period in a manner similar to FIG. 2, and stores this error rate in a built-in register as an error rate X (step S7).

Next, the CPU 32 determines whether or not the error rate X is smaller than a predetermined error rate E1 (step S8). If determining at step S8 that the error rate X is smaller than the predetermined error rate E1, the CPU 32 supplies a slider mechanism 28 through the CPU bus 30 with a track jump instruction for causing the pickup 100 to jump across two tracks (step S9). With the execution of Step S9, the slider mechanism 28 causes the pickup 100 to jump across two tracks towards the outer periphery of the disk.

If it is determined at step S8 that the error rate X is larger than the predetermined error rate E1, the CPU 32 supplies the slider mechanism 28 through the CPU 30 with a track jump instruction for causing the pickup 100 to jump across one track (step S13). With the execution of step S13, the slider mechanism 28 causes the pickup 100 to jump across one track towards the outer periphery of the disk.

After the track jump has been done at step S9 or step S13, the pickup 100 again starts reading information from tracks at a position to which it has jumped.

After the execution of step S9 or S13, the CPU 32 determines whether or not a reproduction end instruction has been issued from the manipulation device 34 in a manner similar to FIG. 2 (step S10).

If determining at step S10 that the reproduction end instruction has not been issued, the CPU 32 returns to the foregoing step S11 to again execute the operation as described above. On the other hand, if determining at step S10 that the reproduction end instruction has been issued, the CPU 32 exits the subroutine for the reproducing operation, and returns to execute the main routine.

FIGS. 8A to 8C and FIGS. 9A to 9C are diagrams for representing the operation of the pickup 100 performed by the execution of the reproducing operation flow illustrated in FIG. 7 when the error rate X satisfies:

Error Rate E1<X.

Figure 8A:
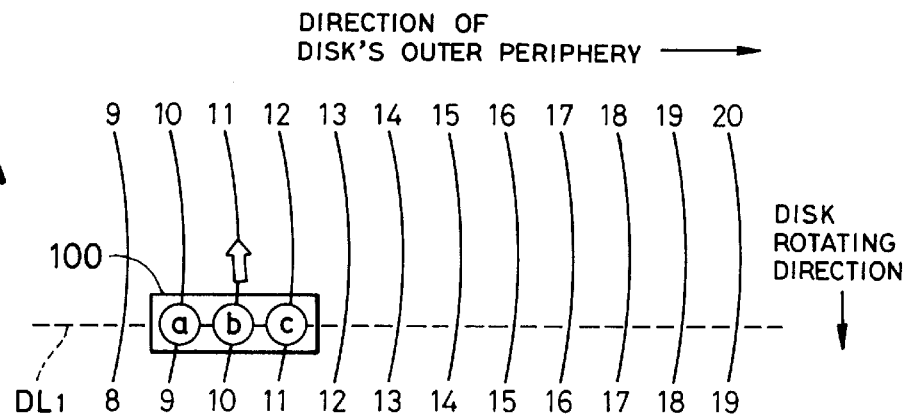
FIGS. 8A to 8C are diagrams representing a reading operation when an error rate X is smaller than an error rate E1.

First, as illustrated in FIG. 8A, the three light detectors 107a–107c mounted in the pickup 100 individually and simultaneously start reading information data recorded on recording tracks 10, 11, 12, respectively, from positions on a disk radial line DL1.

Figure 8B:
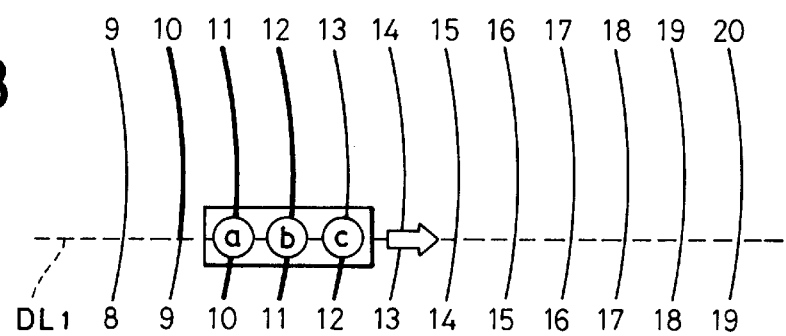
Figure 8C:
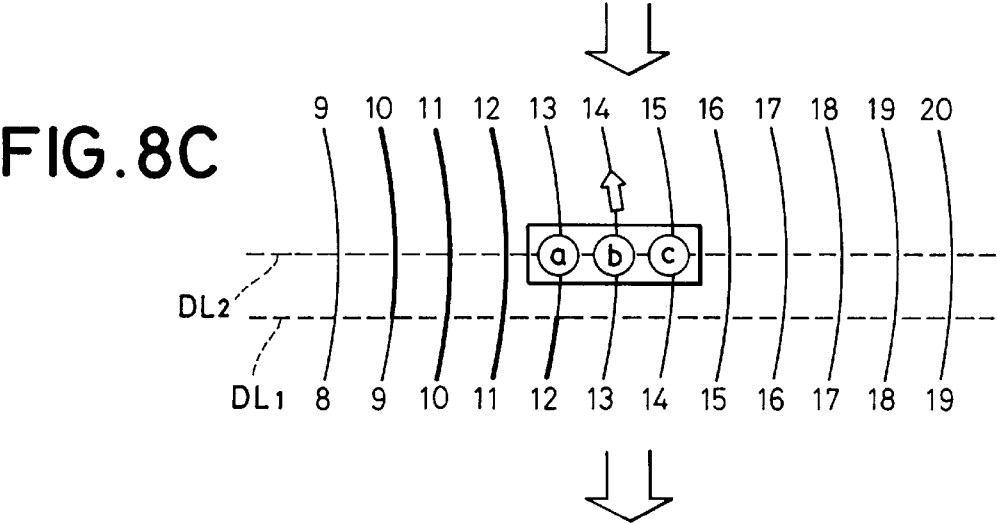

Then, as illustrated in FIG. 8B, when the light detectors 107a, 107b again read information in beginning portions of the recording tracks 11, 12, which had been read in the preceding rotation of the disk, after the disk has been rotated once, the pickup 100 jumps across two tracks towards the outer periphery of the disk. Since the recording disk 23 is still being rotated while the pickup 100 is jumping across two tracks, the pickup 100 jumps to a position on a disk radial line DL2 beyond the disk radial line DL1, as illustrated in FIG. 8C. The pickup 100 starts reading information data recorded on respective recording tracks 13, 14, 15 from that position.

Figure 9A:
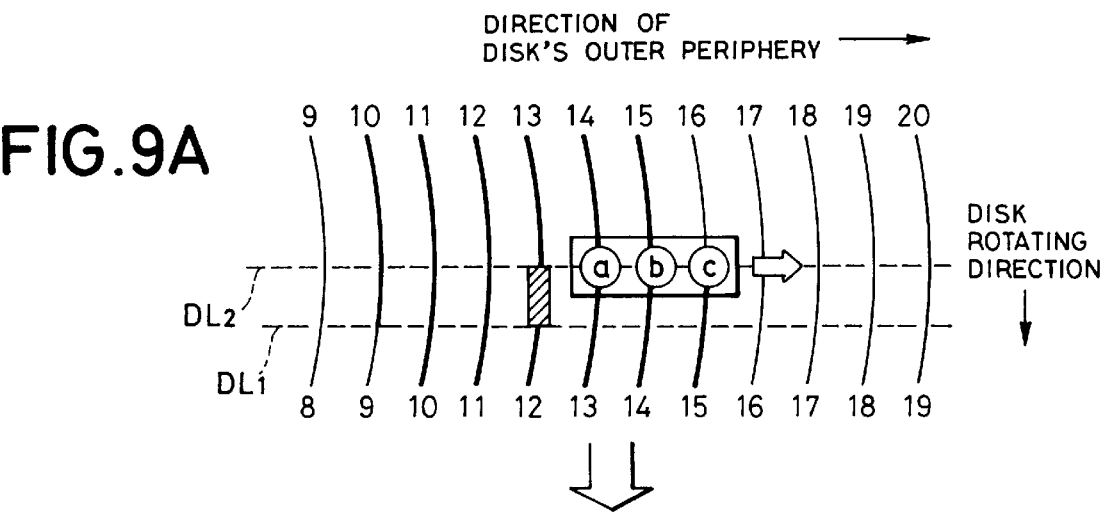
FIGS. 9A to 9C are diagrams representing a reading operation when the error rate X is smaller than the error rate E1.
Figure 9B:
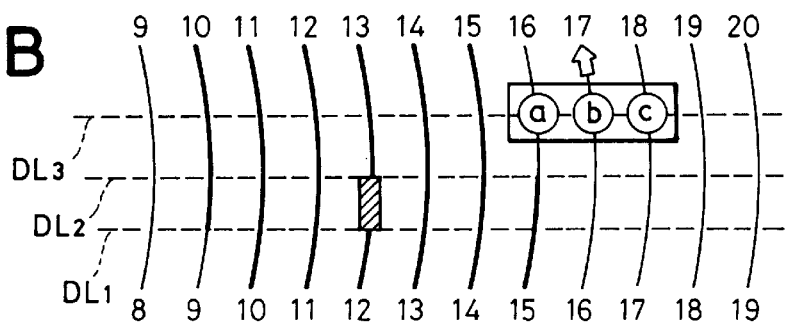

Then, as the light detectors 107a, 107b again read information in beginning portions of the recording tracks 14, 15, which had been read in the preceding rotation of the disk, after the disk has been rotated once, the pickup 100 jumps across two tracks towards the outer periphery of the disk, as illustrated in FIG. 9A. Thus, a beginning portion of the recording track 13, i.e., a portion indicated by hatching in FIG. 9A is an information dropping section from which no information is read. Since the recording disk 23 is still being rotated while the pickup 100 is jumping across two tracks, the pickup 100 jumps to a position on a disk radial line DL3 which is advanced in the reading direction from the disk radial line DL2, on which the preceding read start position exists, as illustrated in FIG. 9B. The pickup 100 starts reading information data recorded on respective recording tracks 16, 17, 18 from that position.

Figure 9C:
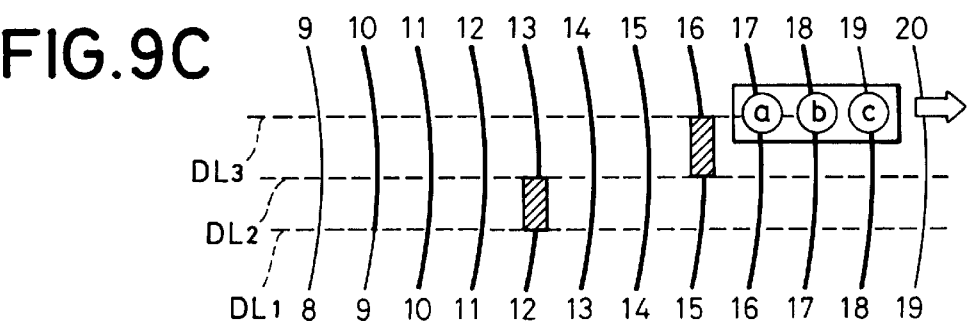

Then, as the light detectors 107a, 107b again read information in beginning portions of the recording tracks 17, 18, which had been read in the preceding rotation of the disk, after the disk has been rotated once, the pickup 100 jumps across two tracks towards the outer periphery of the disk, as illustrated in FIG. 9C. Thus, a beginning portion of the recording track 16, i.e., a portion indicated by hatching in FIG. 9C is an information dropping section from which no information is read.

The information dropping sections indicated by hatching in each of FIGS. 9A–9C are treated as burst errors in the error correcting circuit 29, and recovered by error correction processing performed by the error correcting circuit 29.

In this event, as shown in FIG. 5, the aforementioned error rate E1 refers to an error rate which indicates that if the error rate X during information read is smaller than this error rate E1, burst errors can be substantially corrected by the error correcting circuit 29 even if the total length of the burst errors per block corresponds to eight lines of an ECC block.

Stated another way, if the length of one of the three information dropping sections, indicated by hatching in FIGS. 9A–9C, is smaller than the length corresponding to eight lines of an ECC block, the recording information in that information dropping section can be recovered in the error correcting circuit 29 even if these sections are not read.

As described above, when the read error rate X is smaller than the predetermined error rate E1 as mentioned, an information reading operation for one rotation of a disk until a recording track already read in the preceding rotation of the disk is read again, and a two-track jump operation are repetitively executed in alternation to simultaneously read recorded information from three recording tracks.

FIGS. 10A to 10C and FIGS. 11A to 11C are diagrams for representing the operation of the pickup 100 performed by the execution of the reproducing operation flow illustrated in FIG. 7 when the error rate X satisfies:

X>Error Rate E1.

Figure 10A:
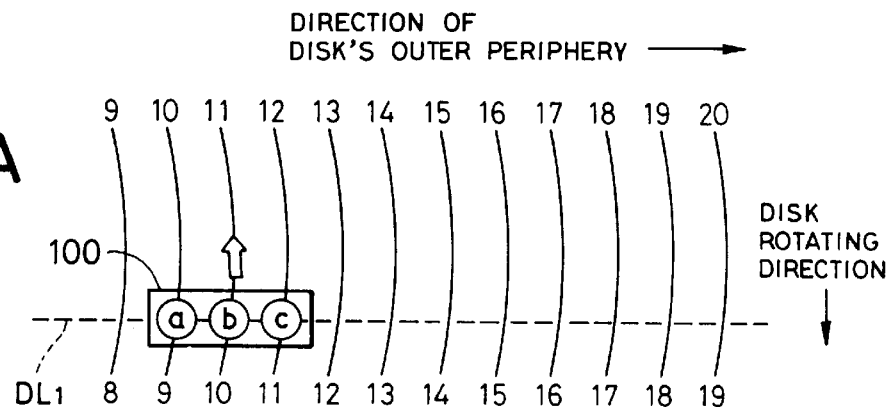
FIGS. 10A to 10C are diagrams representing a reading operation when the error rate X is larger than the error rate E1.

First, as illustrated in FIG. 10A, the three light detectors 107a–107c mounted in the pickup 100 individually and simultaneously start reading information data recorded on recording tracks 10, 11, 12, respectively, from positions on a disk radial line DL1.

Figure 10B:
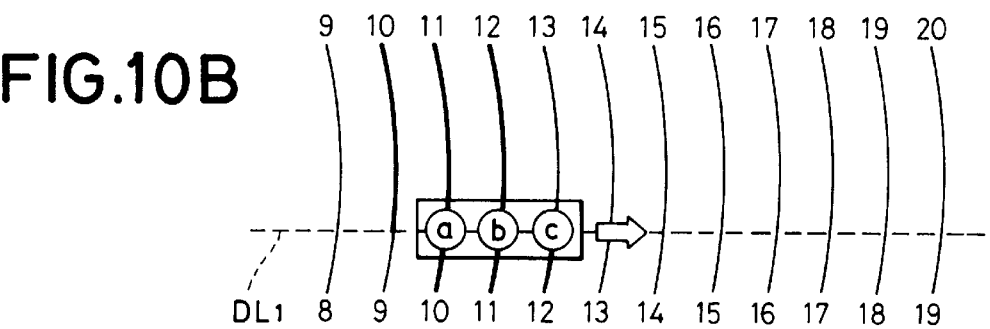
Figure 10C:
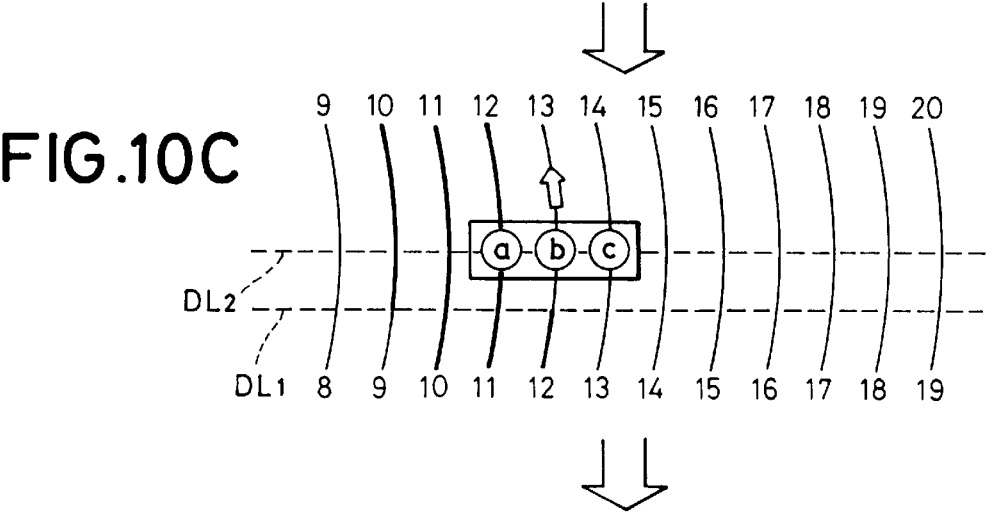

Then, as illustrated in FIG. 10B, when the light detector 107b again reads information in a beginning portion of the recording track 12, which had been read in the preceding rotation of the disk, after the disk has been rotated once, the pickup 100 jumps across one track towards the outer periphery of the disk. Since the recording disk 23 is still being rotated while the pickup 100 is jumping across one track, the pickup 100 jumps to a position on a disk radial line DL2 which is advanced in the reading direction from the disk radial line DL1, as illustrated in FIG. 10C. The pickup 100 starts reading information data recorded on respective recording tracks 12, 13, 14 from that position.

As illustrated in FIG. 11A, when the light detector 107b again reads information in a beginning portion of the recording track 14, which had been read in the preceding rotation of the disk, after the disk has rotated once, the pickup 100 jumps across one track towards the outer periphery of the disk. Since the recording disk 23 is still being rotated while the pickup 100 is jumping across one track, the pickup 100 jumps to a position on a radial disk line DL3 which is advanced in the reading direction from the disk radial line DL2, on which the preceding read start position exists, as illustrated in FIG. 11B. The pickup 100 starts reading information data recorded on respective recording tracks 14, 15, 16 from that position.

Then, as the light detector 107b again reads information in a beginning portion of the recording track 16, which had been read in the preceding rotation of the disk, after the disk has been rotated once, the pickup 100 jumps across one track towards the outer periphery of the disk, as illustrated in FIG. 11C.

As described above, when the read error rate X is smaller than the predetermined error rate E1 as mentioned, an information reading operation for one rotation of a disk until a recording track already read in the preceding rotation of the disk is read again and a one-track jump operation are repetitively executed in alternation to simultaneously read recorded information from three recording tracks.

While the information reading method illustrated in FIGS. 10A to 10C and FIGS. 11A to 11C presents a lower data rate during information read than the method involving the two-track jump illustrated in FIGS. 8A to 8C and FIGS. 9A to 9C, any information dropping section would not occur. Specifically, since the burst error correction in the error correcting circuit 29 does not effectively function when the error rate X is at such a high value that is larger than the error rate E1, a reading operation is performed so as to prevent any information dropping sections from occurring.

The first embodiment illustrated in FIG. 1 and the second embodiment illustrated in FIG. 2 are both adapted to irradiate three mutually adjacent recording tracks with three information reading beams divided by the grating lens 104 so as to read recorded information from the respective recording tracks. The present invention, however, is not limited to this particular configuration. Alternatively, three independent information reading means, for example, may be used to simultaneously read recorded information from three recording tracks.

Also, the number of simultaneously read tracks is not limited to three, but the present invention may be applied to a configuration in which recorded information is simultaneously read from N (N is an integer equal to or larger than two) recording tracks.

In this case, a (N−1)-track jump is performed at step S9 in FIGS. 2 and 7, while a (N−2)-track jump is performed at step S13 in FIG. 7.

More specifically, in the first embodiment, an information reading operation for one rotation of a disk up to the disk radial line DL and a (N−1)-track jump operation are repetitively executed in alternation when the read error rate X is smaller than the error rate E1.

In the second embodiment, in turn, an information reading operation for one rotation of a disk until recording tracks, from which information has been read in the preceding rotation of the disk, are read again, and a (N−1)-track jump operation are repetitively executed in alternation when the read error rate X is smaller than the error rate E1, while the information reading operation for one rotation of the disk until recording tracks, from which information has been read in the preceding rotation of the disk, are read again, and a (N−2)-track jump operation are repetitively executed in alternation when the read error rate X is larger than the error rate E1.

It should be noted that in the second embodiment, if the read error rate X is larger than E1, i.e., if the read error rate is extremely high, a track jump of (N−2) tracks or less may be performed, or the jump operation itself may not be performed.

Further, in the first and second embodiments illustrated in FIGS. 2 and 7, the error rate X is measured each time a next reading operation is started after one track jump operation has been completed. The present invention, however, is not limited to this particular configuration. Alternatively, the measurement may be made, for example, only when a disk is exchanged, or may be periodically made with a timer interruption or the like.

As described above, the recorded information reading method according to the present invention alternately performs a reading operation by information reading means for one rotation of a disk and a (N–1)-track jump operation when a relatively small amount of read errors is included (smaller than the error rate E1) in information data read by the information reading means for simultaneously reading recorded information from each of N recording tracks (N is an integer equal to or larger than two). On the other hand, a reading operation by the information reading means for one rotation of the disk and a track jump operation across (N–2) tracks or less (even including omission of the track jump operation) are alternately performed when a relatively large amount of read errors is included (larger than the error rate E1) in the information data. The simultaneous reading from each of N recording tracks formed on the recording disk is realized by performing the operations as mentioned.

It is therefore possible, according to the present invention, to achieve high speed reproduction since recorded information can be simultaneously reproduced from N recording tracks without degrading an information reading accuracy.

What is claimed is:

1. A recorded information reading method in a recorded information reproducing apparatus for reproducing recorded information on a recording disk to derive reproduced information data, wherein said recorded information reproducing apparatus comprises:

information reading means for simultaneously reading recorded information from each of N recording tracks formed on said recording disk to derive N read signals, where N is an integer equal to or larger than two; and error correcting means for detecting errors possibly occurring in said read signals, correcting said errors, and outputting error corrected read signals as said reproduced information data, said method comprising the step of repetitively executing a reading operation by said information reading means for one rotation of said recording disk and a (N–1)-track jump operation in alternation, when a rate at which said errors occur is less than a predetermined number.

2. A recorded information reading method in a recorded information reproducing apparatus according to claim 1, further comprising the step of repetitively executing a reading operation by said information reading means for one rotation of said recording disk and a track jump operation across (N–2) tracks or less in alternation, when a rate at which said errors occur is greater than the predetermined number.

3. A recorded information reading method in a recorded information reproducing apparatus for reproducing recorded information on a recording disk to derive reproduced information data, wherein said recorded information reproducing apparatus comprises:

information reading means for simultaneously reading recorded information from each of N recording tracks formed on said recording disk to derive N read signals, where N is an integer equal to or larger than two; and error correcting means for detecting errors possibly occurring in said read signals, correcting said errors, and outputting error corrected read signals as said reproduced information data, said method comprising the steps of:

calculating a data error rate in said read signals; and repetitively executing an information reading operation by said information reading means for one rotation of said recording disk to a disk radial line, and a (N–1)-track jump operation in alternation, when said data error rate is smaller than a predetermined error rate.

4. A recorded information reading method in a recorded information reproducing apparatus for reproducing recorded information on a recording disk to derive reproduced information data, wherein said recorded information reproducing apparatus comprises:

information reading means for simultaneously reading recorded information from each of N recording tracks formed on said recording disk to derive N read signals, where N is an integer equal to or larger than two; and error correcting means for detecting errors possibly occurring in said read signals, correcting said errors, and outputting error corrected read signals as said reproduced information data, said method comprising the steps of:

calculating a data error rate in said read signals;

repetitively executing an information reading operation until read signals, which have already been read in the preceding rotation of said disk, are read again, and a (N–1)-track jump operation in alternation, when said data error rate is smaller than a predetermined error rate; and repetitively executing an information reading operation until read signals, which have already been read in the preceding rotation of said disk, are read again, and a track jump operation across (N–2) tracks or less in alternation, when said data error rate is larger than said predetermined error rate.

5. A recorded information reading method according to claim 1, wherein said error detection is a random error detection, and said error correcting means corrects burst errors of a line length which corresponds to the data error rate in said read signals.

6. A recorded information reading method according to claim 2, wherein said error detection is a random error detection, and said error correcting means corrects burst errors of a line length which corresponds to the data error rate in said read signals.

7. A recorded information reading method according to claim 3, wherein said error detection is a random error detection, and said error correcting means corrects burst errors of a line length which corresponds to the data error rate in said read signals.

8. A recorded information reading method according to claim 4, wherein said error detection is a random error detection, and said error correcting means corrects burst errors of a line length which corresponds to the data error rate in said read signals.

9. A recorded information reproducing apparatus for reproducing recorded information on a recording disk to derive reproduced information data, comprising:

information reading means for simultaneously reading recorded information from each of N recording tracks formed on said recording disk to derive N read signals, where N is an integer larger than two;

error correcting means for detecting errors possibly occurring in said read signals, correcting said errors, and outputting error corrected read signals as said reproduced information data; and control means for repetitively executing a reading operation by said information reading means for one rotation of said recording disk and a (N−1)-track jump operation in alternation when a rate at which said errors occur is less than a predetermined number.

10. A recorded information reproducing apparatus according to claim 9, wherein said control means repetitively executes a reading operation by said information reading means for one rotation of said recording disk and a track jump operation across (N−2) tracks or less in alternation, when a rate at which said errors occur is larger than the predetermined number.

11. A recorded information reproducing apparatus for reproducing recorded information on a recording disk to derive reproduced information data, comprising:

information reading means for simultaneously reading recorded information from each of N recording tracks formed on said recording disk to derive N read signals, where N is an integer larger than two;

error correcting means for detecting errors possibly occurring in said read signals, correcting said errors, and outputting error corrected read signals as said reproduced information data;

error rate measuring means for measuring a data error rate in said read signals; and control means for repetitively executing an information reading operation by said information reading means for one rotation of said recording disk to a disk radial line and a (N−1)-track jump operation in alternation, when said data error rate is smaller than a predetermined error rate.

12. A recorded information reproducing apparatus for reproducing recorded information on a recording disk to derive reproduced information data, comprising:

information reading means for simultaneously reading recorded information from each of N recording tracks formed on said recording disk to derive N read signals, where N is an integer larger than two;

error correcting means for detecting errors occurring in said read signals, correcting said errors, and outputting error corrected read signals as said reproduced information data;

error rate measuring means for measuring a data error rate in said read signals; and control means for repetitively executing an information reading operation until read signals, which have already been read in the preceding rotation of said disk, are read again, and a (N−1)-track jump operation in alternation, when said data error rate is smaller than a predetermined error rate, and repetitively executing an information reading operation until read signals, which have already been read in the preceding rotation of said disk, are read again, and a track jump operation across (N−2) tracks or less in alternation, when said data error rate is larger than said predetermined error rate.

13. A recorded information reproducing apparatus according to claim 9, wherein said error detection is a random error detection, and said error correcting means corrects burst errors of a line length which corresponds to the data error rate in said read signals.

14. A recorded information reproducing apparatus according to claim 10, wherein said error detection is a random error detection, and said error correcting means corrects burst errors of a line length which corresponds to the data error rate in said read signals.

15. A recorded information reproducing apparatus according to claim 11, wherein said error detection is a random error detection, and said error correcting means corrects burst errors of a line length which corresponds to the data error rate in said read signals.

16. A recorded information reproducing apparatus according to claim 12, wherein said error detection is a random error detection, and said error correcting means corrects burst errors of a line length which corresponds to the data error rate in said read signals.

* * * * *